United States Patent [19]

Deegener

[11] Patent Number: 4,863,209
[45] Date of Patent: Sep. 5, 1989

[54] SEAT RAIL STRUCTURE FOR CONNECTING A VEHICLE SEAT TO THE FLOOR OF A VEHICLE

[75] Inventor: Elmar Deegener, Kaiserslautern, Fed. Rep. of Germany

[73] Assignee: Keiper Recaro GmbH & Co., Fed. Rep. of Germany

[21] Appl. No.: 109,069

[22] Filed: Oct. 16, 1987

[30] Foreign Application Priority Data

Oct. 17, 1986 [DE] Fed. Rep. of Germany ....... 3635336

[51] Int. Cl.⁴ .............................................. B60N 1/08
[52] U.S. Cl. ................................. 246/65.1; 248/429; 297/317
[58] Field of Search ........................ 296/65 R, 65 A; 248/429, 430; 297/317, 318

[56] References Cited

U.S. PATENT DOCUMENTS

| | | | |
|---|---|---|---|
| 4,274,293 | 6/1981 | Ruger | 248/429 |
| 4,448,381 | 5/1984 | Anspaugh | 248/429 |
| 4,478,383 | 10/1984 | Vrai | 248/429 |
| 4,486,047 | 12/1984 | Nagashima | 248/429 X |
| 4,515,404 | 5/1985 | Nishimura et al. | 296/65 R |
| 4,527,767 | 7/1985 | Rees | 248/429 X |

FOREIGN PATENT DOCUMENTS

| | | |
|---|---|---|
| 2806999 | 8/1979 | Fed. Rep. of Germany . |
| 3442159 | 5/1986 | Fed. Rep. of Germany . |
| 1053430 | 1/1967 | United Kingdom . |
| 2033215 | 5/1980 | United Kingdom . |
| 2100594 | 1/1983 | United Kingdom . |

Primary Examiner—Andres Kashnikow
Assistant Examiner—Matthew C. Graham
Attorney, Agent, or Firm—Wigman & Cohen

[57] ABSTRACT

A seat rail structure for connecting a vehicle seat to the floor of an associated vehicle has a guide rail which is to be secured to the vehicle floor and a slide rail which is to be connected to the seat base of the vehicle seat. The guide rail is reinforced by a longitudinal band which is fixedly connected to it and which is of such cross-section that the combination of the guide rail and longitudinal band forms a girder which is resistant to bending.

8 Claims, 2 Drawing Sheets

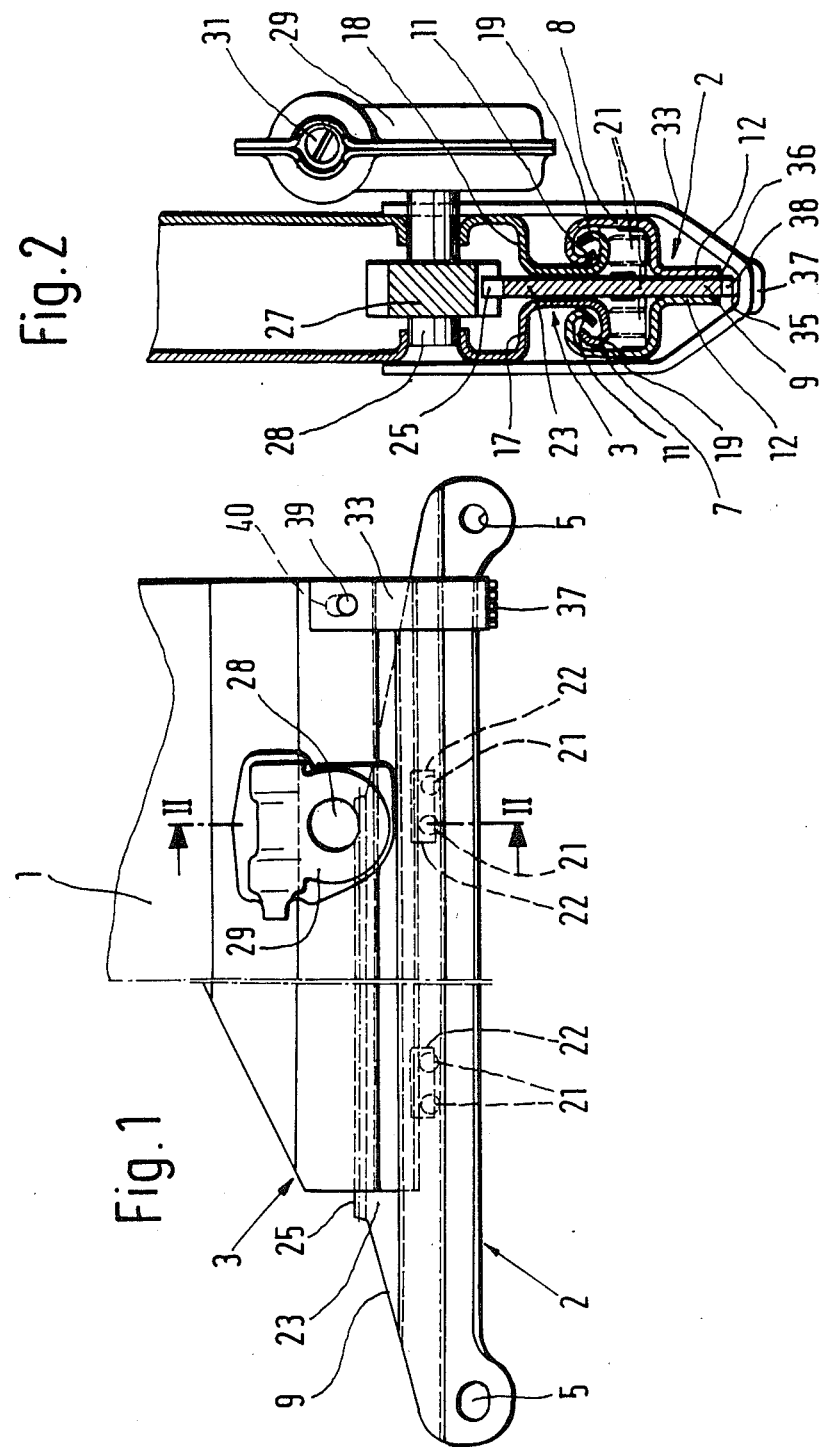

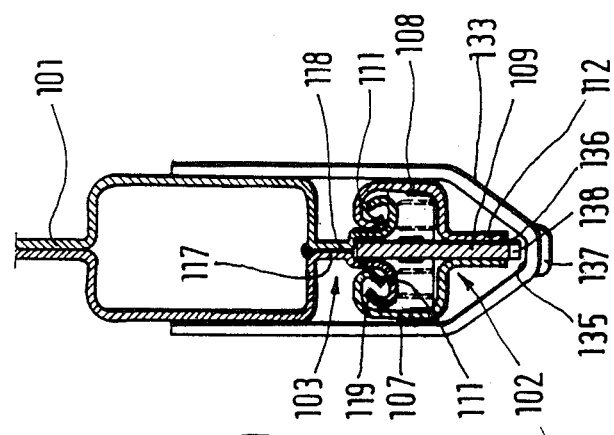
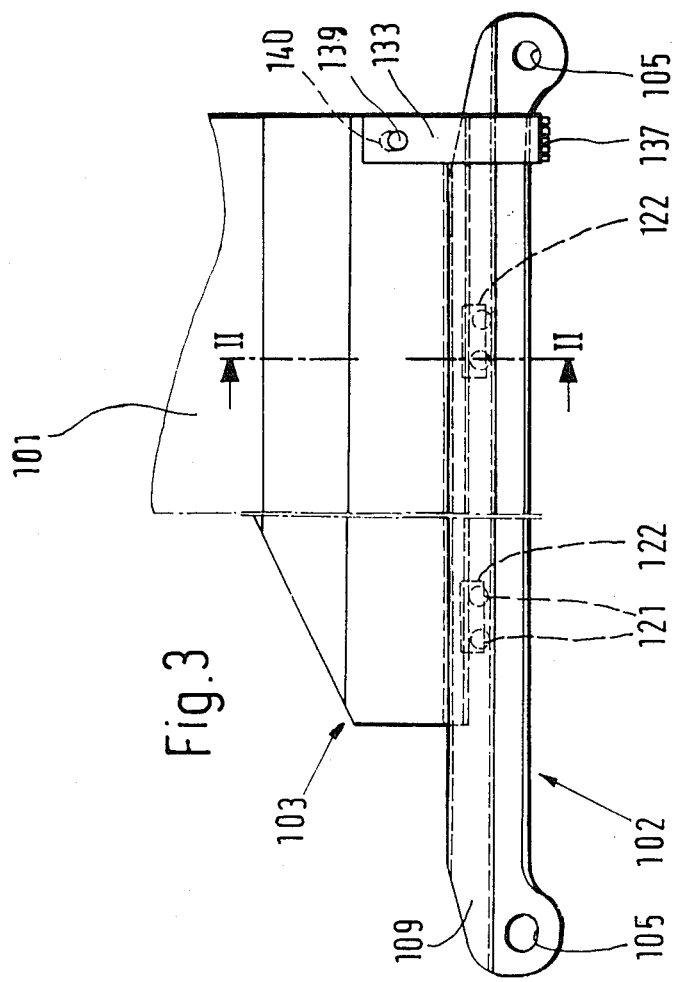

SEAT RAIL STRUCTURE FOR CONNECTING A VEHICLE SEAT TO THE FLOOR OF A VEHICLE

BACKGROUND OF THE INVENTION

The invention relates to a seat rail structure for a motor vehicle and more particularly to seat rail structure in which a slide rail connected to the vehicle seat is guided on a guide rail secured to the vehicle frame.

Under normal conditions, the known seat rail structures of this kind readily meet normal safety requirements. The forces occurring under normal driving conditions which are passed from the seat base through the slide rail into the guide rail are safely absorbed by the guide rail without deformations being caused. Whether the vehicle seat will remain in its fixed position under extreme conditions, i.e., in a crash, does, however, depend decisively on the effectiveness of the safety-belt retaining system associated with the vehicle seat. With the known seat rail structures, it is to be assumed that in an impact the vehicle seat will only retain its fixed position through the seat rail structure if the points at which an effectively operating retaining system is anchored on the vehicle are remote from the seat and the seat rail structure, for example, on the floor and the beam of the vehicle as the inertia forces generated during the impact will be predominantly absorbed directly by the vehicle at the anchoring points of the retaining system and, therefore, will not only act on the guide rail through the slide rail. For various reasons, it is however, desirable to provide at least one anchoring point or the anchoring of the retaining system directly on the vehicle seat. In this case, the total inertia forces resulting from the mass of the seat itself and the mass of the seat user when accelerations occur, or a considerable part of these inertia forces must be kept under control by the seat rail structure. In view of the high accelerations occurring in crashes and the resulting, very high inertia forces, the load bearing capacity of the rails is usually inadequate, at least when the load conditions are unfavorable and the vehicle is subjected to hard impact. This may result in sagging of the rails which, in turn, may cause the slide rail to be torn out of the guide rail.

SUMMARY AND OBJECTS OF THE INVENTION

The object underlying the invention is to remedy this situation, more precisely, to provide a seat rail structure wherein the relation of stability under load to weight is much more favorable and, consequently, the safety requirements can also be met when a belt retaining system is directly anchored on the associated vehicle seat.

This object is achieved, in accordance with this invention, by a seat rail structure exhibiting the features recited in the claims.

Deformation of the guide rail is safely excluded even if a crash occurs under the most unfavorable load conditions, i.e., when the vehicle seat is subjected to the highest possible weight of a seat user, the longitudinal adjustment of the seat is such that the guide rail is subjected to the highest stress in an unfavorable longitudinal section, i.e., at the largest possible distance from the points of connection with the vehicle floor, which are normally at the two ends, and the retaining forces of the belt retaining system act on the seat rail structure through the seat base, because, in accordance with the invention, the guide rail forms together with a longitudinal band fixedly connected to it, a support which is resistant to bending and the cross-section of the longitudinal band is such that the momentum of resistance of the support is sufficiently high to control the forces acting on it under the most unfavorable stress conditions in a crash. Since, in this case, deformation of the guide rail is eliminated by its construction as a support which is resistant to bending, the overlapping longitudinal rail edges of the guide rail and the slide rail remain in safe engagement with each other. In this way, the full securing effect which prevents the slide rail from being lifted out of its guide is maintained and the slide rail can, therefore, not be torn out of the guide rail in spite of the high stress.

In an additional advantageous feature of the invention, the cross-section of the longitudinal band differs in its various longitudinal sections. This results in an optimum support wherein with minimal material expenditure and hence lowest possible weight, the momentum of resistance is adapted throughout the entire length of the support to the different degrees of tension which can occur under the most unfavorable load conditions in the various longitudinal sections of the support.

In a further feature of the invention, the construction may be such that the longitudinal band is a flat steel band which stands on edge in a plane extending perpendicularly to the floor of the vehicle and the height of the flat steel band has a maximum value in that portion of its length which is located centrally between the fixing points on the vehicle floor. Therefore, as desired, the profile height of the girder relative to the plane of effect of the mainly effective bending moments is largest in the central longitudinal segment of the girder where the greatest tensions occur under the most unfavorable load conditions.

In a further advantageous feature of the invention, the guide rail may be comprised of two rail portions with the longitudinal band arranged between these. In this feature the support has a profile which is extremely favorable for the intended purpose. It also has very good stability characteristics and is simple to manufacture by, for example, identical profile rails being welded to the two broad sides of the flat steel band.

The slide rail may, at least in the region adjacent to the guide rail, be comprised of two rail portions which are preferably substantially symmetrical with respect to each other and are separated from each other in the region adjacent to the guide rail by a gap which is engaged by the upper edge region of the longitudinal band. The upper edge region is preferably provided with a toothing which forms a straight rack extending in the direction of the displacement motion and with which a pinion of a longitudinal adjustment gearing meshes. The longitudinal adjustment gearing is provided on the slide rail and is preferably drivable by a motor. According to this feature, the longitudinal band has a double function. It acts not only as part of the rail structure carrying the main load but at the same time as a component of an adjustment drive and/or a locking device.

The longitudinal adjustment gearing can, of course, be replaced by a manual device for adjustment of the seat in the longitudinal direction. Also, in a seat rail structure where the longitudinal band is not in the form of a rack for adjustment and/or locking purposes, a locking device of a known kind such as is to be found in conventional seat rail structures can be used.

In an additional feature of the invention, a retaining bracket secured to the seat base encloses the support comprised of guide rail and longitudinal band in a loop, normally with such play as to permit unimpeded displacement in the longitudinal direction, and when increased stresses occur in a crash, the retaining bracket abuts the support in order to pass load forces into the support. In this feature, the retaining bracket acts in a crash as embracement for the profile of the girder comprised of the guide rail and longitudinal band. This embracement ensures that the girder acts as a closed profile when subjected to load. Therefore, even in a head-on collision at a high impact speed, arching or upward bending of the profile cannot occur.

In an additional feature of the invention, the inside surface of the retaining bracket which in a crash passes the load into the girder and the supporting surface of the girder which bears the load can be provided with detents which in a crash positively secure the bracket and hence the seat base against displacement.

An advantage of this feature is that the longitudinal adjustment device and the locking device associated with it need only be designed to keep the forces acting in the direction of displacement under normal driving conditions under control since the retaining bracket acts as an additional, extremely firm locking device in the event of exceptional stresses.

The invention is explained in detail hereinbelow with reference to embodiments illustrated in the drawings, in which:

BRIEF DESCRIPTION OF THE DRAWINGS

FIG. 1 is a longitudinally shortened side view of an embodiment of the seat rail structure;

FIG. 2 is a broken-away cross-sectional view of the embodiment on a larger scale than in FIG. 1, with the sectional plane designated by II—II in FIG. 1 being focused on the output shaft of an adjustment gearing shown in front, non-sectional illustration; and FIGS. 3 and 4 are views similar to FIGS. 1 and 2 of an embodiment without an adjustment gearing.

DETAILED DESCRIPTION OF THE PREFERRED EMBODIMENTS

A first embodiment of the seat rail structure illustrated in FIGS. 1 and 2 comprises on either side of a seat base 1 carrying a vehicle seat, not shown, or a seat adjustment device, a longitudinally extending pair of rails comprised of a guide rail designated in its entirety by 2 and a slide rail designated in its entirety by 3. Guide rail 2 comprises fixing holes 5 at its two end regions to anchor guide rail 2 to the floor of the vehicle.

As is best seen from the cross-sectional illustration in FIG. 2, guide rail 2 is comprised of two lateral rail portions 7 and 8 and a central longitudinal band 9 arranged between these. Rail portions 7 and 8 are symmetrical with respect to each other, i.e., they can be sections of one and the same profile bar and are welded to the broad side of longitudinal band 9 which is in the form of a flat steel band standing on edge and defining the plane of symmetry between rail portions 7 and 8. The profile of rail portions 7, 8 corresponds substantially to a C-shaped profile wherein the upper longitudinal rail edges 11 are of downwardly inwardly bent configuration and the lower profile edges 12 are of downwardly bent, extended configuration and form flat abutment surfaces with which they abut longitudinal band 9 and which are welded to it.

Slide rail 3 is similarly comprised of two rail portions 17 and 18 which in the region closer to guide rail 2 are likewise, as in the case of rail portions 7 and 8, symmetrical with respect to each other and, in particular, in relation to the same plane of symmetry as the latter.

In the embodiment shown herein, in the region adjacent to guide rail 2, the profile of rail portions 17 and 18 of slide rail 3 is the same as the profile of rail portions 7 and 8, i.e., they have a C-shaped profile which is, however, arranged complementarily with rail portions 7 and 8, with the C of rail portions 17 and 18 being open in the outward direction and the bent longitudinal rail edges 19 corresponding to the longitudinal rail edges 11 forming the lower edges of slide rail 3 by means of which it engages the profile interior of guide rail 2. The longitudinal rail edges 19 of slide rail 3 are overlapped by the longitudinal rail edges 11 of guide rail 2—see FIG. 2. Thus slide rail 3 is guided on guide rail 2 for displacement in the longitudinal direction, but is prevented from being lifted out of the guide by the longitudinal rail edges 11 and 19 overlapping each other.

For the displacement which enables longitudinal adjustment of the seat base 1 and hence of the vehicle seat, the underside of slide rail 3, i.e., the bottom surface of rail portions 17 and 18 adjoining the bent longitudinal rail edges 19 is mounted on supporting bodies which in the illustrated embodiment are comprised of rolling bodies 21 arranged in roller cages 22. Instead of the two cages 22 shown in FIG. 1, it is, of course, possible to provide several cages or one continuous cage and a different number of rolling bodies 21. The rolling bodies could be replaced by flat sliding elements or continuous sliding bars.

As is apparent from FIG. 1, the longitudinal band 9 in the form of a flat steel band has a different cross-section in the various longitudinal sections, i.e., the upright flat steel band is less high in the end regions adjacent to fixing holes 5 than in the central region furthest from fixing holes 5 in which the longitudinal band 9 is highest. With such a longitudinal band cross-section, the momentum of resistance of the girder formed by longitudinal band 9 and rail portions 7 and 8 of guide rail 2 which are connected to the longitudinal band is adapted to the maximum tensions which can occur at the girder fixed on either side at fixing holes 5 under the most unfavorable stress conditions.

The most unfavorable stress conditions occur when in a crash the vehicle seat is subjected to the largest possible weight of a seat user and is so adjusted that the load on the girder comprised of guide rail 2 and longitudinal band 9 acts with the largest possible load component at the largest possible distance from fixing holes 5. Due to the longitudinal band 9 being highest in the central section, the necessary bending resistance is imparted to the girder in the most susceptible longitudinal section. Hence the stresses which occur can be safely kept under control and guide rail 2 cannot become deformed to such an extent that the interlocking connection of longitudinal rail edges 11 and 19 is broken. Supporting bodies 21 transmit compressive forces from slide rail 3 to guide rail 2 and reduce the force required for displacement.

In the embodiment shown in FIGS. 1 and 2, the gap between rail portions 17 and 18 of slide rail 3 which are located alongside each other is engaged by longitudinal band 9 with its upper edge region 23 which in that longitudinal section in which the longitudinal band 9 is highest is in the form of a straight rack 25. The toothing of rack 25 may serve for longitudinal adjustment and/or longitudinal locking. In the present embodiment, a pinion 27 secured in the space between rail portions 17 and 18 of slide rail 3 on an output shaft 28 of a longitudinal adjustment gearing 29 meshes with rack 25. Gearing 29 is in the form of a self-locking worm gear whose worm wheel is connected for rotation with output shaft 28 and whose worm is drivable by way of a coupling member 31 arranged on the worm shaft, preferably by means of a flexible shaft which can be made to rotate by hand or by a drive motor which is not illustrated. As worm gear, gearing 29 is self-locking and, therefore, pinion 27 serves for both longitudinal adjustment and longitudinal locking. It will, however, be understood that in addition to or instead of pinion 27, a conventional longitudinal locking device may be provided for interlocking of guide rail 2 and slide rail 3 in selected positions to prevent longitudinal displacement.

Arranged at the rear end region of seat base 1 relative to the direction of travel of the associated vehicle is an arresting bracket 33 which is connected to the seat base by a bolt 39 extending through the bracket. The bolt 39 which is engaged by the retaining system, not illustrated, penetrates an upwardly extending elongate hole 40 in the seat base. The arresting bracket consists of a steel band enclosing the girder comprised of guide rail 2 and longitudinal band 9 in a closed loop—see FIG. 2.

The loop is of such length that it surrounds the girder with such play as to normally permit unimpeded displacement of the slide rail in the longitudinal direction. If, howveer, in a crash, the stress exceeds a certain value, bolt 39 is moved upwardly in elongate hole 40 and arresting bracket 33 is taken along with it. The arresting bracket then abuts the opposite bottom surface 36 of guide rail 2 with its bottom inside surface 35. Downwardly extending notches 37 provided in the inside surface 35 cooperate with detent teeth 38 formed on the exposed underside of the guide rail acting as support surface for arresting bracket 33 at the lower longitudinal edge of longitudinal band 9. The resulting detent engagement locks slide rail 3 additionally in the event of a crash to prevent displacement in the longitudinal direction. Also, the arresting bracket 33 transmits transverse forces onto the girder once stresses occur which begin to exceed the securing action of the overlapping longitudinal rail edges 11 and 19. Due to the enclosure or embracement of the profile of the girder comprised of rail portions 7 and 8 of guide rail 2 and longitudinal band 9, the girder profile acts as a closed box profile, i.e., the embracement acts in the sense that the load bearing capability is increased.

The embodiment shown in FIGS. 3 and 4, wherein parts corresponding to those of the previously described embodiment are denoted by reference numerals which have been increased by 100, differs essentially from the first embodiment in that no longitudinal adjustment gearing is provided and hence the upper edge region of longitudinal band 109 is not in the form of a rack.

As in the previously described embodiment, longitudinal band 109 is in the form of a flat steel band which, containing the plane of symmetry, is secured between rail portions 107 and 108 of guide rail 102 and is higher in its central longitudinal region remote from fixing holes 105 than in the outer end regions. The total height of longitudinal band 109 is, however, less than in the previously described embodiment. Consequently, longitudinal band 109 is less effective with respect to reinforcement of the girder than the higher longitudinal band 9 of the first embodiment. This can, however, be compensated for by use of a material with a higher strength for longitudinal band 109.

The special advantage of the less high longitudinal band 109 is that the two rail portions 117 and 118 of slide rail 103 can be directly joined, for example, welded together, in the lower end region directly adjoining guide rail 102 because they are not separated from each other in this lower end region by the longitudinal band extending between them, as in the first described embodiment. The mutual connection in the lower end region is both desirable for stability reasons and expedient in view of the manufacturing tolerances which are to be adhered to.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A seat rail structure for connecting a motor vehicle seat having a seat base, to the floor of a vehicle, comprising:
    a guide rail adapted to be secured to the vehicle floor; and
    a slide rail which is connectable to the seat base of the vehicle seat and which is guided on the guide rail for displacement in the longitudinal direction of the guide rail to adjust the seat in the longitudinal direction and which is prevented by an interlocking connection from being lifted out of its guide on the guide rail;
    wherein the guide rail is reinforced by a separate longitudinal band fixedly connected to said guide rail to form a girder which is resistant to bending, and wherein the longitudinal band is in the form of a flat steel band standing on edge in a plane extending perpendicularly to the vehicle floor; and
    wherein the cross-section of the longitudinal band is selected such that the momentum of resistance of the girder is adapted for reliable control of the forces acting on the girder under the most unfavorable load conditions in a crash.

2. The seat rail structure according to claim 1, wherein the cross-section of the longitudinal band varies in its various longitudinal sections.

3. The seat rail structure according to claim 2, wherein said guide rail is provided with fixing means located at either end of said guide rail and wherein the height of the flat steel band has a maximum value in the central longitudinal region located between said fixing means.

4. The seat rail structure according to claim 3, wherein the guide rail is comprised of two rail portions with the longitudinal band arranged between said rail portions.

5. The seat rail structure according to claim 4, wherein the slide rail is comprised of two rail portions and, in the region adjacent to the guide rail, said two rail portions are adjacent said slide rail and are separated from each other by a gap which is engaged by the longitudinal band with its upper edge region which is provided with a toothing which forms a straight rack extending in the direction of the displacement motion and with which a pinion of a longitudinal adjustment gearing meshes, which gearing is provided on the slide rail.

6. The seat rail structure of claim 5 in which said gearing provided on the slide rail is drivable by a motor.

7. The seat rail structure according to claim 1, further comprising an arresting bracket secured to the seat base, said arresting bracket closing the girder in a loop normally with such play as permits unimpeded displacement in the longitudinal direction and which abuts the girder to direct load forces into sad girder when increased stresses occur in a crash.

8. The seat rail structure according to claim 7, wherein the inside surface of the arresting bracket which in a crash directs the load into the girder and the support surface of the girder which bears the load are provided with detents which positively secure the brackets and hence the seat base against displacement in a crash.

* * * * *